United States Patent
Law

(10) Patent No.: US 8,300,721 B2
(45) Date of Patent: Oct. 30, 2012

(54) PSEUDORANDOM NOISE CODE ACQUISITION IN DIRECT SEQUENCE SPREAD SPECTRUM SYSTEMS

(75) Inventor: Wai Kwok Law, Point Roberts, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1423 days.

(21) Appl. No.: 11/686,270

(22) Filed: Mar. 14, 2007

(65) Prior Publication Data

US 2008/0225928 A1  Sep. 18, 2008

(51) Int. Cl.
*H04L 5/12* (2006.01)
(52) U.S. Cl. ........................................ 375/265; 375/147
(58) Field of Classification Search .................. 375/148, 375/134, 136, 144, 265, 329, 340; 370/235, 370/329
See application file for complete search history.

(56) References Cited

U.S. PATENT DOCUMENTS

| | | | | |
|---|---|---|---|---|
| 6,345,073 | B1* | 2/2002 | Curry et al. | 375/265 |
| 7,480,324 | B2* | 1/2009 | Aiello et al. | 375/130 |
| 2003/0087644 | A1* | 5/2003 | Miyoshi et al. | 455/452 |
| 2004/0096012 | A1* | 5/2004 | Yang | 375/308 |
| 2004/0202228 | A1* | 10/2004 | Kaewell et al. | 375/144 |
| 2004/0252790 | A1* | 12/2004 | Yang et al. | 375/340 |
| 2006/0193290 | A1* | 8/2006 | Suzuki et al. | 370/329 |
| 2006/0203731 | A1* | 9/2006 | Tiedemann et al. | 370/235 |
| 2007/0014343 | A1* | 1/2007 | Horneman et al. | 375/225 |
| 2007/0041473 | A1* | 2/2007 | Chen et al. | 375/329 |
| 2007/0233383 | A1* | 10/2007 | Churan | 701/213 |

OTHER PUBLICATIONS

Wei Su and John Kosinski, U. S. Army CECOM RDEC, Intelligence and Information Warfare Directorate, AMSEL-RD-IW-I, Fort Monmouth, NJ 07703—"A Survey of Digital Modulation Recognition Methods"; 5 Pages.
Agilent Technologies, Inc.—"Speed Development of New Wireless Data Devices With Agilent's Cost-Effective, Multi-Format R&D Test Solutions"; Agilent Technologies E5515C Wireless Communications Test Set; pp. 1-16; www.agilent.com; Agilent Technologies, Inc. 2002.2005—5988-5950EN.
Agilent Technologies, Inc.—"Agilent RF Parametric and Functional Test for Wireless Designs"; pp. 1-4. www.agilent.com; Agilent Technologies, Inc. 2005—5989-3397EN.
Agilent Technologies, Inc.—"How Digitally Generated Faded Signals Reduce Cost of Test"; Application Note, pp. 1-8; www.agilent. com; Agilent Technologies, Inc. 2005—5989-3248EN.
Agilent Technologies, Inc.—"Speed Wireless Device Development Using the 8960 Test Set to Create a Network in a Box"; 2 Pages; www.agilent.com; Agilent Technologies, Inc. 2005—5989-2488EN.
Agilent Technologies, Inc.—"E6706A 1xEV-DO Lab Application"; pp. 1-4; www.home.agilent.com/product.
Winncom Technologies—"Wireless Classroom—Spread Spectrum"; pp. 1-2; www.winncom.com/classroom.aspx?room=48.

* cited by examiner

*Primary Examiner* — Leon-Viet Nguyen

(57) ABSTRACT

A method for receiving spread spectrum signals and for initial code acquisition from the received signals comprises despreading the received signals, based on code phase synchronization, to produce a de-spread signal; and performing a modulation detection based on a change of time-domain characteristic of the de-spread signal.

26 Claims, 5 Drawing Sheets

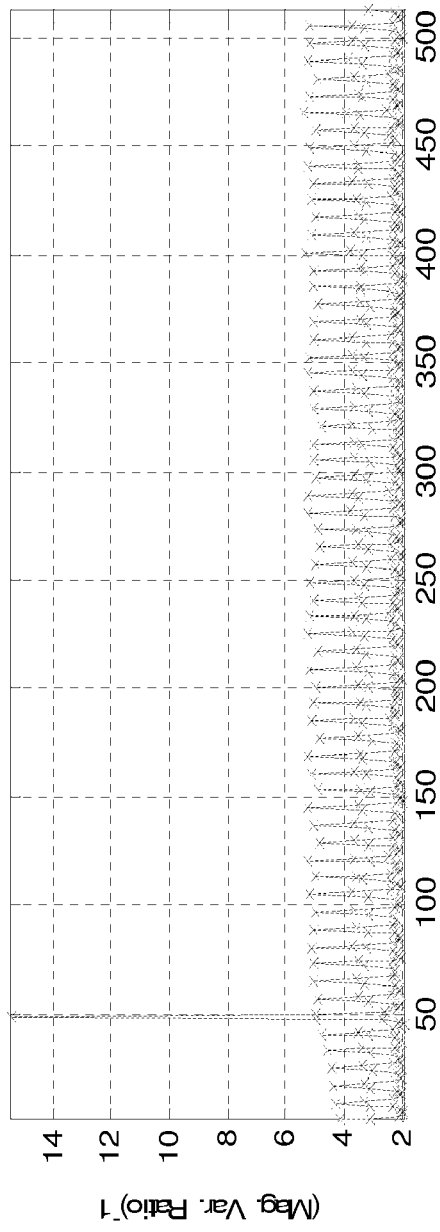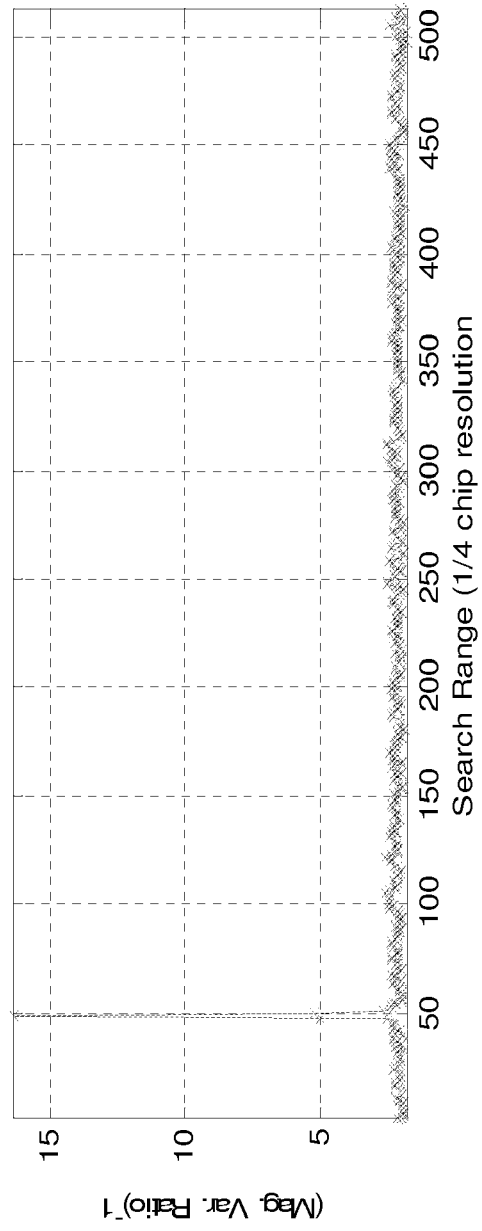
FIG. 5
FIG. 6

PSEUDORANDOM NOISE CODE ACQUISITION IN DIRECT SEQUENCE SPREAD SPECTRUM SYSTEMS

BACKGROUND OF THE INVENTION

The invention relates to the field of wireless communications, for instance to spread spectrum techniques such as Code Division Multiple Access (CDMA). It has particular applicability to 1xEV-DO.

Direct sequence spread spectrum (DS-SS) systems include transmitters and receivers. A spread-spectrum signal is produced for transmission by modulating and then spreading an original signal, employing a Pseudorandom Noise (PN) sequence. The receiver needs to de-spread the signal it receives, and then demodulate the de-spread signal. To do so, the receiver performs an "initial code acquisition" which employs a receiver-generated replica of the PN sequence. That PN sequence is synchronized with that of the received signal, in order to de-spread the received signal, and then to demodulate the de-spread signal. The initial code acquisition in both phase and frequency has been a challenging problem, because of factors including the uncertainties in the estimated time delay and frequency offset.

SUMMARY OF THE INVENTION

A method for initial code acquisition from received spread spectrum signals comprises de-spreading the received signals, based on code phase synchronization, to produce a de-spread signal; and performing a modulation detection based on a change of time-domain characteristic of the de-spread signal.

Further features and advantages of the present invention, as well as the structure and operation of preferred embodiments of the present invention, are described in detail below with reference to the accompanying exemplary drawings.

BRIEF DESCRIPTION OF THE DRAWINGS

FIGS. 5 and 6 are graphs representing the results of a simulation run on an embodiment of the invention.

DETAILED DESCRIPTION

In direct sequence spread spectrum systems, the carrier phase of the transmitter abruptly changes as a function of a pseudo-random code sequence and the information data in the spreading process. For instance, Code Division Multiple Access (CDMA) is a spread spectrum technique which uses high-speed pseudorandom noise (PN) codes to scramble data words, and to spread spectral occupancy (that is, to cause the coded data signal to cover a broader spectrum of frequencies than that of the original signal) for added robustness.

Performing a spread spectrum coding of an information signal is generally achieved by multiplying the digital information signal with a spreading code, also known as a chip sequence. The chip sequence has a much faster data rate than the information signal, so the signal bandwidth is expanded, or "spread", beyond the original bandwidth occupied by just the information signal.

The term "chip", meaning an encoding element, is used to distinguish the shorter coded bits from the longer uncoded bits of the information signal. (In the foregoing, "shorter" and "longer" refer to time periods.) The amount of spreading, for direct sequence, is dependent on the ratio of "chips per bit".

Chip, in the context of CDMA, refers to binary digits transmitted over the RF link. For instance, the chip rate in IS-95 is 1.2288 MHz (thus allowing adequate guard bands to permit the carriers to be spaced 1.25 MHz apart). Each bit is represented by many chips. If a majority of the chips get through, then the bit can be reconstructed properly. The number of chips representing each bit varies, depending on the bit rate. For example, an 8K Vocoder, such as the Enhanced Variable Rate CODEC (EVRC), employs a ratio of 128 chips for each bit.

Figure 1:
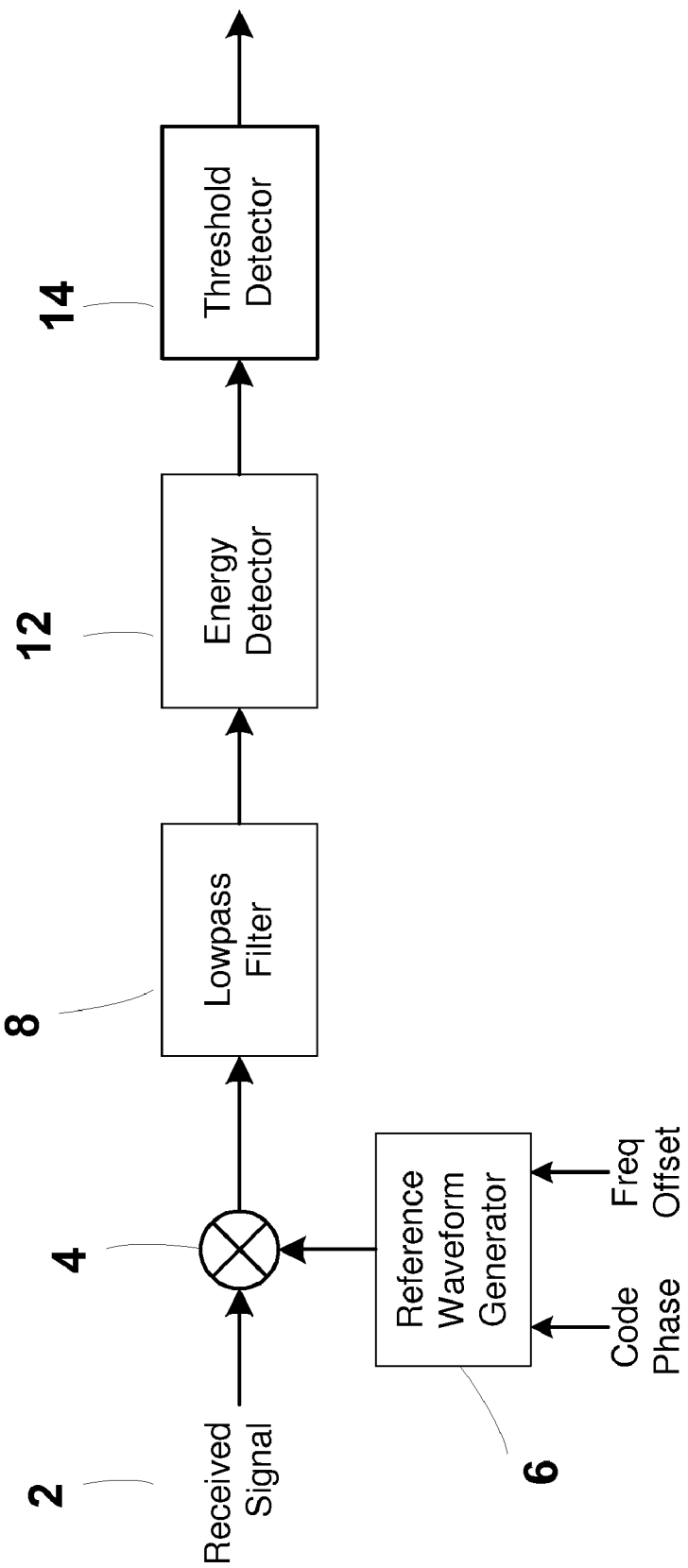
FIG. 1 is a high-level block diagram of a spread spectrum receiver for performing initial code acquisition.

FIG. 1 is a block diagram showing an initial code acquisition system for received spread spectrum signals. Such a system may be implemented in either the analog or the digital domain. Embodiments of the invention that are implemented in the digital domain will be described in more detail below, in connection with FIGS. 3 and 4.

In the system of FIG. 1, a received signal 2, such as a baseband signal, is de-spreaded by a de-spreading mixer 4, which de-spreads the received signal 2 by modulating it according to a reference spreading waveform produced by a reference spreading waveform generator 6. The de-spreaded signal is then filtered by a low-pass filter 8.

The reference waveform generator 6 employs, as inputs, a code phase and a frequency offset. When the code phase and frequency offset are synchronized, modulating the received baseband signal 2 will cause it to collapse in bandwidth. The total signal power, which had been spread across a wide bandwidth in the received signal, is concentrated within a narrower bandwidth.

Figure 2:
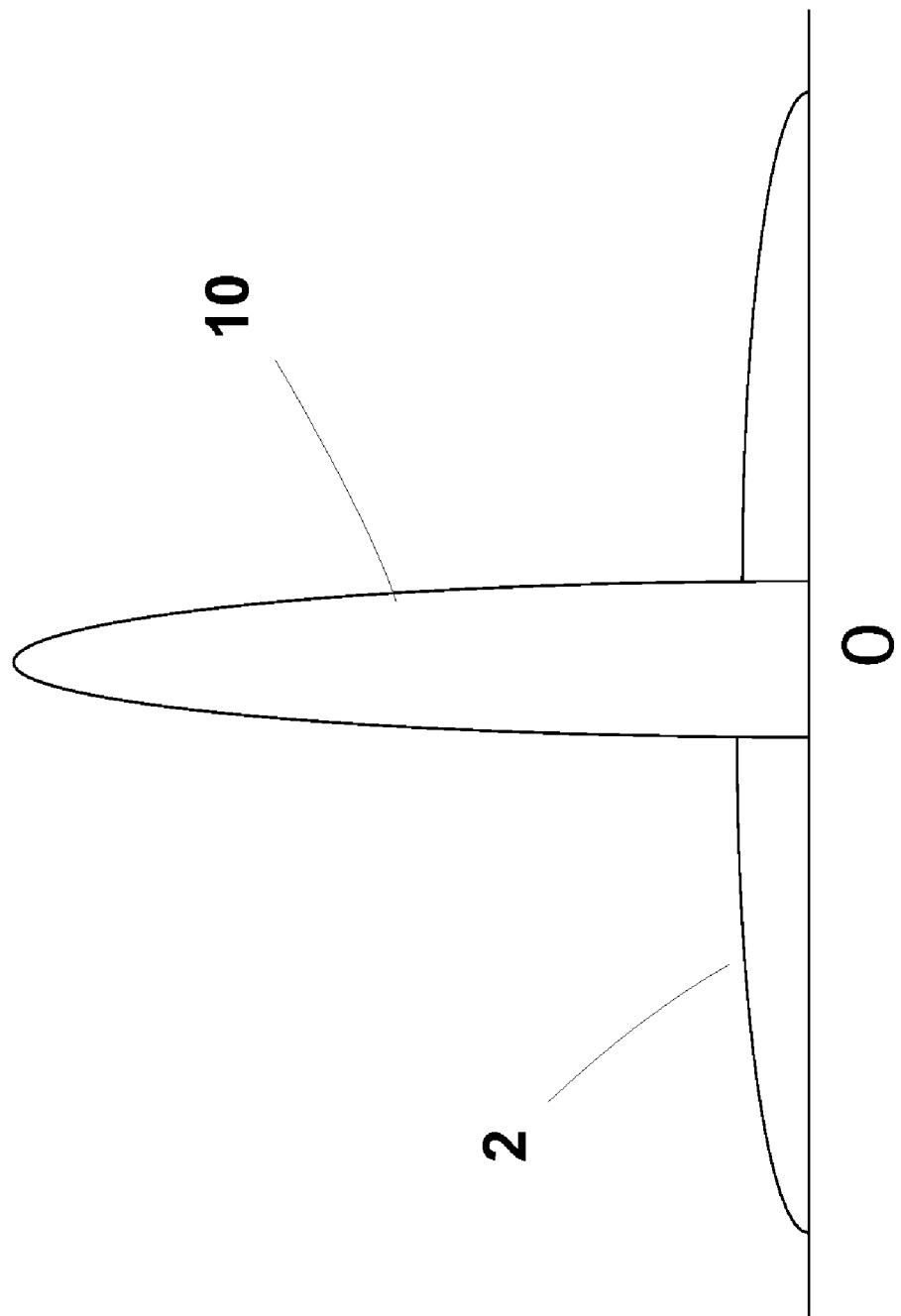
FIG. 2 is a graph of signals from the system of FIG. 1.

See, for instance, the graphical representation of FIG. 2, which shows a magnitude-vs.-frequency graph of the received baseband signal 2 of FIG. 1, and a low-pass-filtered signal 10, that is output from the low-pass filter 8. As shown, the spread bandwidth of the received signal 2 is relatively wide, but the bandwidth of the signal 10 is narrower. Also, the magnitude of the narrower-bandwidth low-pass-filtered signal 10 is greater than that of the received signal 2.

In a spread-spectrum system, the desired signal intended to be received for a particular PN code at the receiver will collapse into a narrow bandwidth at a relatively high power level. The power outside the narrow bandwidth of low-pass filter is interference power, i.e., unintended signals, which will be de-spreaded as interference over a wider bandwidth at a lower power level. For instance, in a testing environment where the communication channel between the transmitter (not shown) and receiver (such as that of FIG. 1) is an RF cable, the searching ranges of code phase and frequency offset are generally very well constrained to be small, compared to an open air channel.

Referring again to FIG. 1. the increased maximum power level (e.g., the peak of the signal 10) at the output of the low-pass filter 8 is detected by an energy detector 12, whose output goes to a threshold detector 14. The threshold detector 14 compares the output of the energy detector 12 with a specified threshold level, and outputs a result that indicates whether the energy detector 12's output exceeds or does not exceed the threshold level specified for the threshold detector 14. The output of the threshold detector 14 is, in essence, a Boolean expression which interprets a signal exceeding the threshold as detection of a received spread spectrum signal.

The filter bandwidth of the low-pass filter 8 is set approximately equal to the spreading bandwidth divided by the spreading factor of the code channel to be detected. When the spreading factor is large, the resulting narrow bandwidth of the low-pass filter 8 will cause this code acquisition technique to be more sensitive to frequency offset. Thus, a two dimensional search in frequency offset, as well as code phase, may be employed to synchronize the received signal 2. The ranges of code phase and frequency offset to be searched are determined by factors such as the propagation delay and the Doppler frequency shift.

In a testing environment where the communication channel between the transmitter (not shown) and receiver (such as that of FIG. 1) is an RF cable, the searching ranges of code phase and frequency offset are generally very well constrained to be small, compared to an open air channel. This code acquisition technique works well when the power of the de-spreading signal to be detected in the low-pass filter bandwidth is way above the interference power.

However, if the interference power from other code channels becomes more and more dominant, the change of power level in the low-pass filter bandwidth before and after the de-spreading will be very small, and hard to detect, given the same low pass filter bandwidth. In such a scenario, the low pass filter bandwidth can be reduced to be narrower so that the desired signal power relative to the interference power can be increased within a very narrow bandwidth but the narrower low pass bandwidth will result in higher sensitivity to frequency offset and much longer search time. Therefore, the code acquisition system of FIG. 1 may not work in some scenarios when the power distribution across multiple code channels makes it difficult to detect the change of power level of the detected code channel before and after the de-spreading.

A code acquisition system embodying the invention exploits the change of time-domain characteristic of the received signal when the code phase is synchronized.

Figure 3:
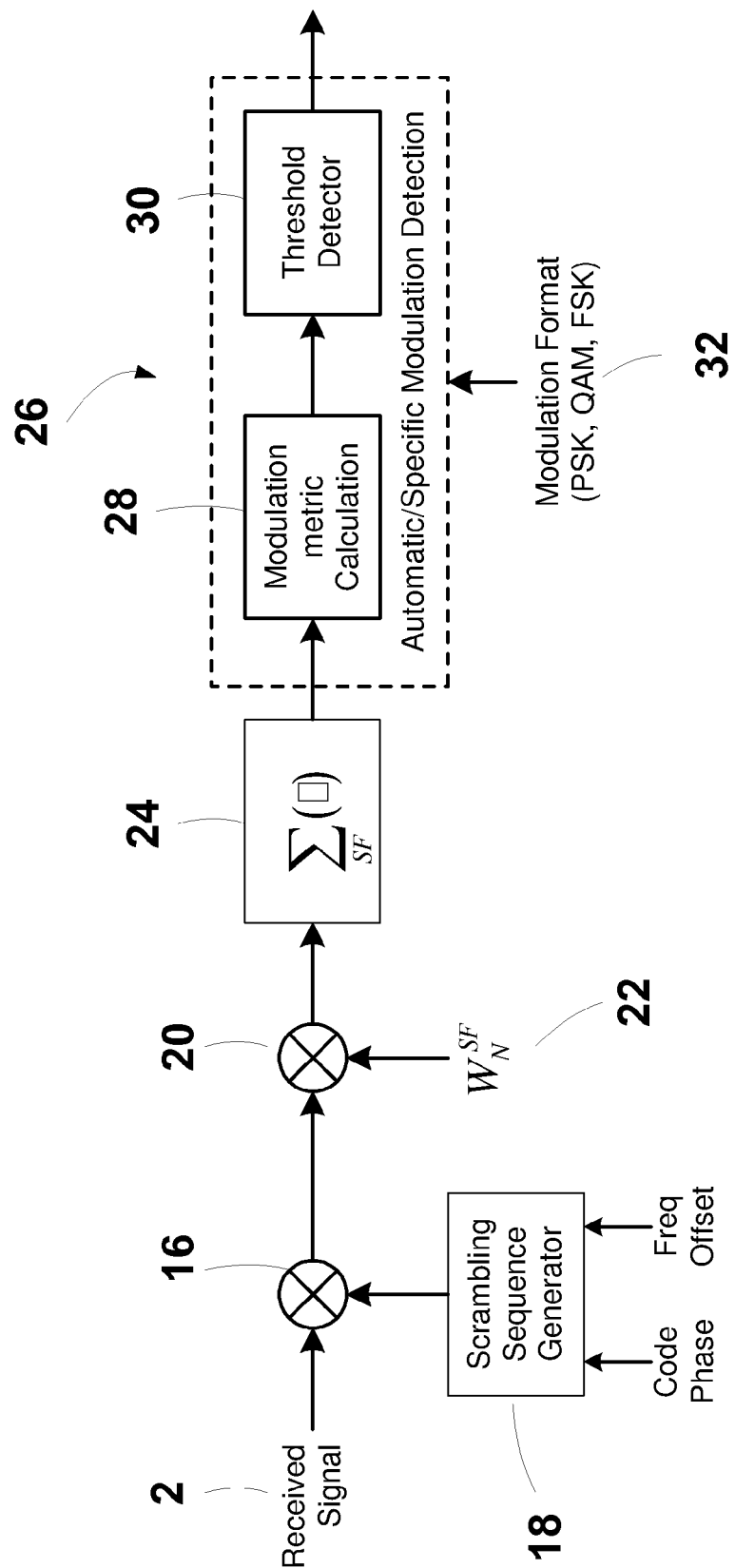
FIGS. 3 and 4 are more detailed block diagrams of spread spectrum receivers for performing initial code acquisition embodying the invention.

FIG. 3 is a block diagram of such a system embodying the invention. A received signal 2 is equivalent to that of FIG. 1. In this embodiment, the received signal 2 is made up of digital samples. As an alternative to using the de-spreading mixer 4 and modulating with a reference waveform 6 as shown in FIG. 1, a de-scrambler 16 descrambles the received signal 2, using a scrambling sequence from a scrambling sequence generator 18. The scrambling sequence generator 18 generates the scrambling sequence based on a given code phase and frequency offset, so the de-scrambler 16 may operate for each code phase and frequency offset being searched.

The de-scrambled received signal is then de-spread by a de-spreader 20. In this embodiment, the de-spreader 20 functions at a particular Walsh Code Channel ($W_N^{SF}$) 22, to produce Walsh de-spread symbols.

Conceptually, the functions of descrambling by the de-scrambler 16 and Walsh de-spreading by the de-spreader 20 in FIG. 3 are alternatives to the modulator 4 in FIG. 1. The reference spreading code in FIG. 1 is analogous to combining the de-scrambling and Walsh codes. The functions of descrambling and Walsh de-spreading in the embodiment of FIG. 3 serve a purpose comparable to that of modulating in the embodiment of FIG. 1. For implementations of 1xEVDO in the digital domain, an embodiment such as that of FIG. 3 may be used.

A summer 24 receives the Walsh de-spread symbols and performs a bandwidth reduction function analogous to that of the low pass filter in FIG. 1.

Then, modulation detection is performed. In the digital-domain implementation of FIG. 3, the Walsh de-spread symbols (output of the summer 24) are provided as inputs to a modulation detector 26, which includes a modulation metric calculator 28 and a threshold detector 30. Within the modulation detector 26, the metric calculator 28 calculates a metric for each specific modulation format to be detected. The metric is passed to the threshold detector 30, to detect the presence of a specified modulation format 32.

When the code phase and frequency offset are synchronized, the modulation detector 26 will recognize a specific modulation format from the Walsh de-spread symbols 22, and detect it as a hit in code phase acquisition.

The system of FIG. 3 is an implementation of a code acquisition algorithm, which detects a form of modulation format at a particular active Walsh code channel when the code phase is synchronized. The defense industry has performed research on modulation recognition. See, for instance, the modulation format recognition methods described in [1] Wei Su and John Kosinski, "A Survey Of Digital Modulation Recognition Methods", GSPx 2003 Conference Paper, April, 2003; and [2] Elsayed Azzouz and Asoke Kumar Nandi, "Automatic Modulation Recognition Of Communication Signals", Kluwer Academic Publishers Group, October 1996.

In an embodiment of the invention, modulation recognition techniques such as those described therein are applied to the problem of initial code acquisition.

An example will be given, to illustrate the use of an embodiment of the invention to perform code acquisition in the 1xEV-DO Rev. A System. See FIG. 4, which will be discussed in detail below.

In the 1xEV-DO Rev. A system, a pilot channel is used to transmit a well-defined data pattern, known at both transmitter and receiver, for synchronization and channel estimation. The reverse link pilot channel power in the worst case scenario can be as small as less than 1% relative to the total transmitting power, as most of the power is distributed in other high-speed code channels. Such a small percentage of energy in the pilot channel requires a very long correlation period of more than 10 k chips in order to detect the pilot channel reliably. However, a long correlation period makes the correlation result more sensitive to frequency offset, and thus increases the number of search passes in frequency offset dimension. The long correlation time, coupled with more searches in frequency offset, results in a much longer initial acquisition time.

One alternative solution is to use the a code acquisition system embodying the invention, such as that described above in connection with FIG. 3, to detect the presence of a particular modulation format at other high-power active code channels, instead of performing long correlation on the low-power pilot channel. The modulation formats that can be used in other data code channels in the 1xEV-DO Rev. A system include BPSK, QPSK and 8PSK. These modulation formats are different forms of phase modulation. Therefore, the modulation detector will be configured to detect any kind of phase modulation for two active data code channels. See, for instance, the block diagram of FIG. 4.

Figure 4:
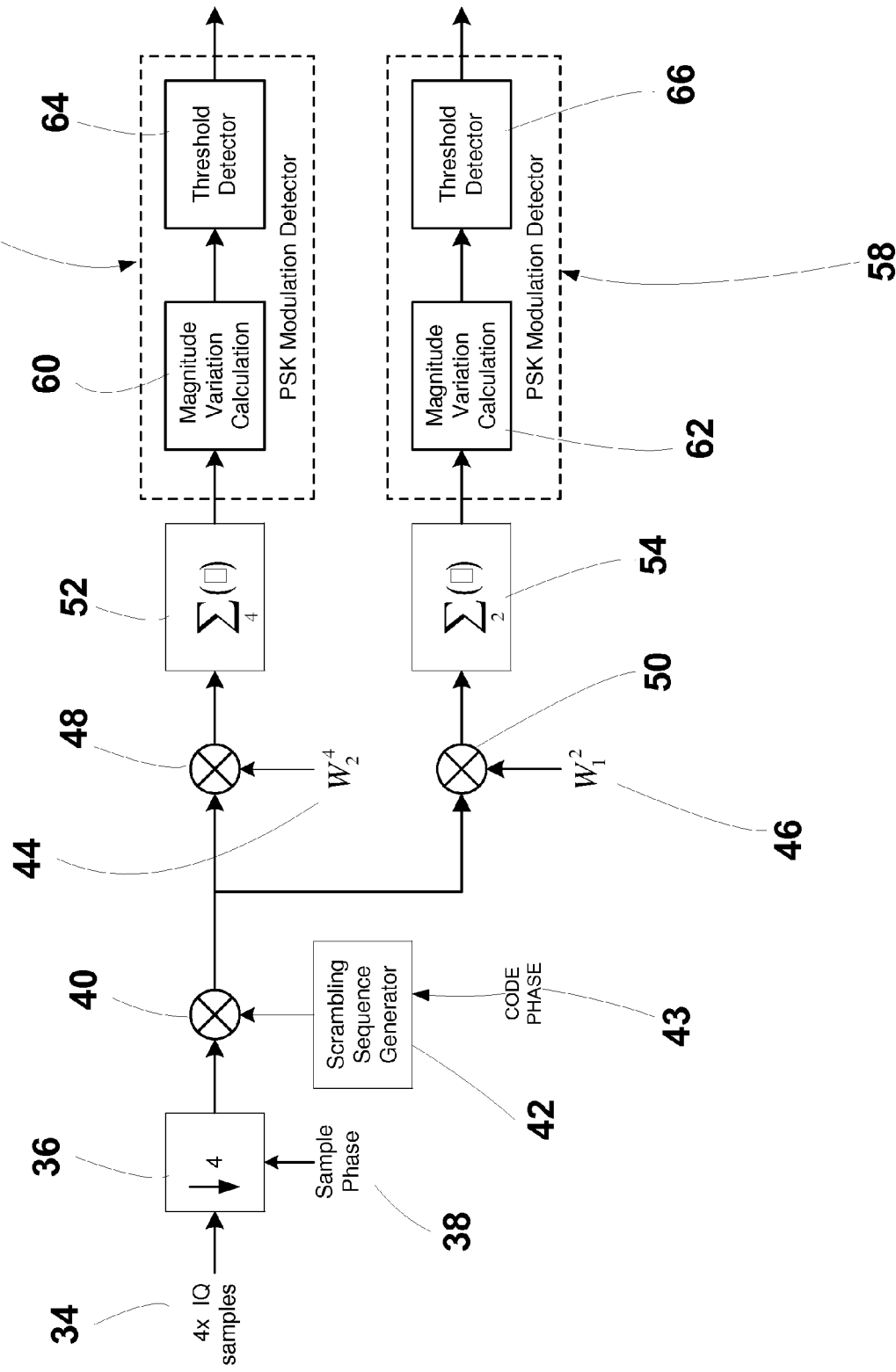

FIG. 4 is a block diagram of an embodiment of the invention, to be employed for code acquisition of a received 1xEV-DO spread spectrum data signal.

The front-end of the above 1xEV-DO acquisition system differs from that of FIG. 3, in that the search of frequency offset is eliminated. This is because, first, the de-spreading length of each Walsh symbol is much shorter than the correlation length used on pilot channel. Second, the metric used to detect the PSK modulation is not sensitive to any phase variation in the received signal.

Referring to FIG. 4, a received 1xEV-DO signal 34 is designated "4×IQ." In this expression, "IQ" stands for Inphase Quadrature, which refers to complex baseband signals. "4×" refers to the fact that the baseband signal is sampled at four times the spreading rate. The received signal 34 is decimated by a factor of 4 by a digital decimator 36 which decimates the sampling rate by 4 times at a particular sample phase 38 which is an input parameter. Then it is de-scrambled by a descrambler 40, using a scrambling sequence from a scrambling sequence generator 42. The scrambling sequence generator produces the scrambling sequence as a function of a code phase 43, which is input to it. By varying different values for the decimator sample phase 38 and scrambling code phase 43, a large range of scrambling code phase can be searched at ¼ chip resolution.

The de-scrambled signal is then split, and treated separately by two different active data code channels, which are used to detect the code synchronization for two different Walsh code channels, shown as $W_2^4$ 44 and $W_1^2$ 46, using respective de-spreaders 48 and 50.

The signal being synchronized is a composite signal which includes multiple active Walsh code channels transmitted by a mobile station. Since all active Walsh code channels transmitted from the same mobile are scrambled by the same unique scrambling code, they should all have the same scrambling code phase.

According to the 1xEV-DO rev. A standard, the possible active data Walsh channels can be W(4,2), W(2,1) or both (as shown in FIG. 4). With no prior knowledge about which data Walsh code channel being active, modulation detection is performed on W(4,2) and W(2,1) so that all three different combinations of active Walsh code channels can be detected.

Therefore, when W(4,2) and W(2,1) are both active, the detected code phase shown in FIGS. 5 and 6 (to be discussed below) should be the same.

Respective summers 52 and 54 receive the Walsh de-spread symbols and perform a bandwidth reduction function analogous to that of the summer 24 of FIG. 3.

After the Walsh de-spreading and summing, modulation detection is performed by PSK modulation detectors 56 and 58. Each of the modulation detectors 56 and 58 includes a modulation metric calculator, corresponding to the modulation metric calculator 28 of FIG. 3. In the example of FIG. 4, these are shown as magnitude variation calculators 60 and 62, respectively. The modulation detectors 56 and 58 further include threshold detectors 64 and 66, respectively, which may be similar to the threshold detector 30 of FIG. 3.

The magnitude variation calculators 60 and 62 calculate the respective magnitude variations of the de-spread symbols as the modulation metric, to detect the presence of PSK modulation. The magnitude variation may be given by the expression $$MagVar = \frac{std(|x|)}{mean(|x|)}$$

This expression gives the ratio of the standard deviation to the mean of Walsh symbols magnitudes (|x|).

A simulation has been done to test this algorithm on the 1xEV-DO reverse link signal in which 99% of the total transmitted power is assigned to the two data channels ($W_2^4$ and $W_1^2$) with signal impairments of 15% EVM and 5 kHz carrier frequency offset. The inverse of the magnitude variation vs. the search range, in ¼ chip resolution of two data code channels, are plotted in the graphs of FIGS. 5 and 6.

From the plots, it can be seen that the peaks of the inverse ratio on both data channels are found at the same sample phase (designated in the plots as Search Range=50) at which the received signal is synchronized with local scrambling code. Search Range refers to the range of code phase being searched in the initial code acquisition process. FIGS. 5 and 6 show the inversion of magnitude variation at different code phases applied at 38 and 43 in FIG. 4.

As shown in FIGS. 5 and 6, the search range spans over 125 chips at the resolution of ¼ chip period. The peak ratio found at the sample phase of 50 is the indication of detecting a spread spectrum signal which is in sync with the receiver-generated replica of PN sequence at the sample phase of 50.

In the graph of FIG. 5, there is shown an oscillation, generally from about 2 to about 5 on the scale of magnitude variation ratio. This oscillation behavior of the noise floor at $W_1^2$ is due to the nature of the Hybrid Phase Shift Keying (HPSK) used in the reverse link complex scrambling. Since the de-spread length of each Walsh data channel is small, and the metric of magnitude variation calculation is removing the effects of signal phase, the detection of PSK modulation is not very sensitive to phase noise or frequency offset. As a result, the acquisition time will be improved by eliminating the search of frequency offset.

In conclusion, a code acquisition system and method embodying the invention is developed to perform the initial code synchronization by the detecting the presence of a modulation format at any active code channel when the code phase is synchronized. It can be used on any active code channels without any prior information of defined pilot data pattern. Moreover, the search of frequency offset can be eliminated if the de-spreading length of active Walsh code channel is short, and the metric used in the modulation detection has no phase information.

Embodiments of the invention, as described with reference to the systems of FIGS. 3 and 4 given above, will be understood to include various implementations which may be in discrete or integrated circuitry. Other such embodiments may where applicable include a processor, computer, microcomputer, or other processing system or component, along with software program code for performing functionality as described. Embodiments are also contemplated which include any combination thereof. Where such embodiments include a processor, etc., with software for performing such functionality, further embodiments of the invention may also include the software program code, provided on a processor-readable medium such as a CD-ROM, floppy disk, etc., or provided for downloading over a network such as the Internet, etc.

Although the present invention has been described in detail with reference to particular embodiments, persons possessing ordinary skill in the art to which this invention pertains will appreciate that various modifications and enhancements may be made without departing from the spirit and scope of the claims that follow.

What is claimed is:

1. An initial code acquisition method, comprising:
    receiving a spread spectrum signal including symbols;
    de-spreading the received spread spectrum signal based on code phase synchronization to produce a de-spread signal; and
    detecting a modulation format of the received spread spectrum signal based on a change of a time-domain characteristic of the de-spread signal,
    wherein the change of a time-domain characteristic comprises a magnitude variation in a despread symbol in the de-spread signal.

2. A method as recited in claim 1, wherein the de-spreading is based on frequency offset and code phase synchronization.

3. A method as recited in claim 2, wherein:
   a range of code phase to be searched is determined by a propagation delay of the spread spectrum signal; and
   a range of frequency offset to be searched is determined by a Doppler frequency shift of the spread spectrum signal.
4. A method as recited in claim 1, where the de-spreading includes de-scrambling.
5. A method as recited in claim 4, wherein the de-scrambling employs a scrambling sequence that is a function of a code phase.
6. A method as recited in claim 1, wherein the de-spreading includes de-spreading at one of a set of code channels, each of the code channels being based on a respective one of a set of orthogonal functions.
7. A method as recited in claim 6, wherein:
   the set of orthogonal functions includes a set of Walsh functions, each of the orthogonal functions comprising a respective one of the Walsh functions; and
   the de-spreading includes de-scrambling and de-spreading at a predetermined Walsh code channel that corresponds with the respective one of the Walsh functions.
8. A method as recited in claim 7, wherein the de-spreading includes:
   generating a scrambling sequence based on a code phase and a frequency offset;
   multiplying the received signal by the scrambling sequence to produce a product thereof; and
   multiplying the product by the respective one of the Walsh functions.
9. A method as set forth in claim 1, wherein detecting the modulation format of the received spread spectrum signal includes
   recognizing a modulation format from among a plurality of possible modulation formats for the spread spectrum signal; and
   detecting a threshold activity at the recognized modulation format.
10. A method as recited in claim 9, wherein recognizing the modulation format includes recognizing based on Walsh code channels.
11. A method as recited in claim 1, wherein:
    the received spread spectrum signal is modulated with one of a plurality of possible modulation formats; and
    detecting the modulation format of the received spread spectrum signal includes:
    (i) calculating a metric for each of the possible modulation formats,
    (ii) comparing the calculated metric for the modulation format to a threshold, and
    (iii) detecting the presence of a given one of the modulation formats based on the comparison with the threshold.
12. A method as recited in claim 11, wherein the calculating a metric includes calculating the magnitude variation in the de-spread signal.
13. An initial code acquisition system, comprising:
    de-spreading circuitry for de-spreading a received spread spectrum signal based on code phase synchronization to produce a de-spread signal comprising symbols; and
    a modulation detector for detecting a modulation format of the received spread spectrum signal based on a change of a time-domain characteristic of the de-spread signal, wherein the change of a time-domain characteristic comprises a magnitude variation in a despread symbol in the de-spread signal.
14. A system as recited in claim 13, wherein the de-spreading circuitry includes circuitry that is operable based on frequency offset and code phase synchronization.

15. A system as recited in claim 14, wherein:
    a range of code phase to be searched is determined by a propagation delay of the spread spectrum signal; and
    a range of frequency offset to be searched is determined by a Doppler frequency shift of the spread spectrum signal.
16. A system as recited in claim 13, where the de-spreading circuitry includes de-scrambling circuitry.
17. A system as recited in claim 16, wherein the de-scrambling circuitry employs a scrambling sequence that is a function of a code phase.
18. A system as recited in claim 13, wherein the de-spreading circuitry includes de-spreading circuitry for de-spreading at one of a set of code channels, each of the code channels being based on a respective one of a set of orthogonal functions.
19. A system as recited in claim 18, wherein:
    the set of orthogonal functions includes a set of Walsh functions, each of the orthogonal functions comprising a respective one of the Walsh functions; and
    the de-spreading circuitry includes circuitry for de-scrambling and de-spreading at a predetermined Walsh code channel that corresponds with the respective one of the Walsh functions.
20. A system as recited in claim 19, wherein the de-spreading circuitry includes:
    scrambling sequence generating circuitry that is operable based on a code phase and a frequency offset;
    first multiplying circuitry for multiplying the received signal by the scrambling sequence to produce a product thereof; and
    second multiplying circuitry for multiplying the product by the respective one of the Walsh functions.
21. A system as set forth in claim 13, wherein the modulation detector includes:
    circuitry for recognizing a modulation format from among a plurality of possible modulation formats for the spread spectrum signal; and
    circuitry for detecting a threshold activity at the recognized modulation format.
22. A system as recited in claim 21, wherein the circuitry for recognizing includes circuitry for recognizing based on Walsh code channels.
23. A system as recited in claim 21, wherein:
    the received spread spectrum signal is modulated with one of a plurality of possible modulation formats; and
    the modulation detection circuitry includes:
    (i) circuitry for calculating a metric for each of the possible modulation formats,
    (ii) circuitry for comparing the calculated metrics to a threshold, and
    (iii) circuitry for detecting the presence of a given one of the modulation formats based on the comparison with the threshold.
24. A system as recited in claim 23, wherein the circuitry for calculating a metric includes circuitry for calculating the magnitude variation in the de-spread signal.
25. A system as recited in any of claims 13-24, wherein circuitry recited therein is implemented as a processor and software for performing the operation of the recited circuitry.
26. A non-transitory computer-readable medium encoded with a computer program, for directing a processing system to perform initial code acquisition for received spread spectrum signals, the computer-readable medium comprising:
    software program code, provided on the computer-readable medium, for directing the processing system to perform a method as recited in any of claims 1-12.

* * * * *